(12) United States Patent
El-Ibiary

(10) Patent No.: US 7,821,220 B2
(45) Date of Patent: Oct. 26, 2010

(54) MOTOR HAVING INTEGRAL PROGRAMMABLE LOGIC CONTROLLER

(75) Inventor: Yehia M. El-Ibiary, Simpsonville, SC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 359 days.

(21) Appl. No.: 11/541,303

(22) Filed: Sep. 29, 2006

(65) Prior Publication Data

US 2008/0197797 A1 Aug. 21, 2008

(51) Int. Cl.
*H02P 5/06* (2006.01)
(52) U.S. Cl. .................. 318/600; 318/625; 318/538
(58) Field of Classification Search ............. 318/34–44, 318/632, 139, 635, 652, 560, 51, 67, 111, 318/112, 565, 569, 685, 696, 600, 538, 625, 318/434; 702/183, 184; 340/683, 635; 73/579, 73/593; 455/33.1, 38.1
See application file for complete search history.

(56) References Cited

U.S. PATENT DOCUMENTS

| | | | | |
|---|---|---|---|---|
| 4,779,031 A | * | 10/1988 | Arends et al. ............... 318/565 |
| 4,942,571 A | * | 7/1990 | Moller et al. ............... 370/407 |
| 5,013,981 A | * | 5/1991 | Rodi ........................... 318/67 |
| 5,038,088 A | * | 8/1991 | Arends et al. ............... 318/565 |
| 5,452,201 A | * | 9/1995 | Pieronek et al. ............. 700/83 |
| 5,491,831 A | * | 2/1996 | Williams et al. .......... 455/66.1 |
| 5,610,493 A | * | 3/1997 | Wieloch ..................... 318/801 |
| 5,623,191 A | * | 4/1997 | Wieloch ..................... 318/801 |
| 5,699,609 A | * | 12/1997 | Wieloch ..................... 29/830 |
| 5,739,648 A | * | 4/1998 | Ellis et al. ................... 318/112 |
| 5,844,501 A | | 12/1998 | El-Ibiary |
| 5,912,541 A | * | 6/1999 | Bigler et al. ................ 318/600 |
| 5,939,807 A | | 8/1999 | Patyk et al. |
| 5,995,910 A | * | 11/1999 | Discenzo .................... 702/56 |
| 6,000,825 A | * | 12/1999 | Fredriksson .................. 700/9 |
| 6,053,047 A | * | 4/2000 | Dister et al. ................. 73/593 |
| 6,160,365 A | * | 12/2000 | Younger et al. .............. 318/16 |
| 6,163,129 A | * | 12/2000 | Younger et al. ............ 318/799 |
| 6,175,205 B1 | * | 1/2001 | Michenfelder et al. ...... 318/444 |
| 6,199,018 B1 | * | 3/2001 | Quist et al. .................. 702/34 |
| 6,289,735 B1 | * | 9/2001 | Dister et al. ................. 73/579 |
| 6,295,510 B1 | * | 9/2001 | Discenzo .................... 702/183 |
| 6,297,742 B1 | * | 10/2001 | Canada et al. .............. 340/635 |
| 6,434,512 B1 | * | 8/2002 | Discenzo .................... 702/184 |
| 6,445,332 B1 | * | 9/2002 | Younger et al. ............. 341/176 |
| 6,445,966 B1 | * | 9/2002 | Younger et al. .............. 700/83 |
| 6,539,135 B1 | * | 3/2003 | Canning et al. ............. 385/11 |
| 6,651,110 B1 | | 11/2003 | Caspers et al. |

(Continued)

*Primary Examiner*—Paul Ip
(74) *Attorney, Agent, or Firm*—Fletcher Yoder LLP; Alexander R. Kuszewski; John M. Miller

(57) ABSTRACT

A system, in one embodiment, includes a drive having a housing, a stator disposed in the housing, a rotor disposed in the stator, and a programmable logic controller disposed inside, mounted on, or in general proximity to the housing. In another embodiment, a system includes a network, a first motor having a first integral programmable logic controller coupled to the network, and a second motor having a second integral programmable logic controller coupled to the network. In a further embodiment, a system includes a rotary machine having a rotor and a stator disposed concentric with one another, a microprocessor, memory coupled to the microprocessor, a power supply coupled to the microprocessor and the memory, and a machine sensor coupled to the microprocessor.

19 Claims, 6 Drawing Sheets

U.S. PATENT DOCUMENTS

| | | | |
|---|---|---|---|
| 6,653,810 B2* | 11/2003 | Lo | 318/569 |
| 6,867,682 B2* | 3/2005 | Reinhardt et al. | 340/3.5 |
| 6,872,106 B2* | 3/2005 | Kanno | 440/2 |
| 6,933,698 B2* | 8/2005 | Miura et al. | 318/625 |
| 6,979,971 B2* | 12/2005 | Takamune et al. | 318/632 |
| 7,035,115 B2* | 4/2006 | Walesa | 361/788 |
| 7,042,188 B2* | 5/2006 | Miura et al. | 318/400.09 |
| 7,081,731 B2* | 7/2006 | Asama et al. | 318/635 |
| 7,102,318 B2* | 9/2006 | Miura et al. | 318/400.4 |
| 7,184,867 B2* | 2/2007 | Okuyama | 701/36 |
| 7,317,290 B2* | 1/2008 | Gandrud et al. | 318/105 |
| 2002/0093303 A1* | 7/2002 | Lo | 318/569 |
| 2003/0011465 A1* | 1/2003 | Reinhardt et al. | 340/3.5 |
| 2003/0071587 A1* | 4/2003 | Suzuki et al. | 318/139 |
| 2003/0082962 A1* | 5/2003 | Kanno | 440/2 |
| 2003/0184252 A1* | 10/2003 | Takamune et al. | 318/632 |
| 2004/0078097 A1* | 4/2004 | Bruzy et al. | 700/48 |
| 2004/0201972 A1* | 10/2004 | Walesa | 361/788 |
| 2005/0201408 A1* | 9/2005 | Otani et al. | 370/438 |
| 2006/0067020 A1 | 3/2006 | Ewing et al. | |
| 2008/0084171 A1* | 4/2008 | Leehey et al. | 318/34 |
| 2008/0169774 A1* | 7/2008 | Cheng et al. | 318/135 |

\* cited by examiner

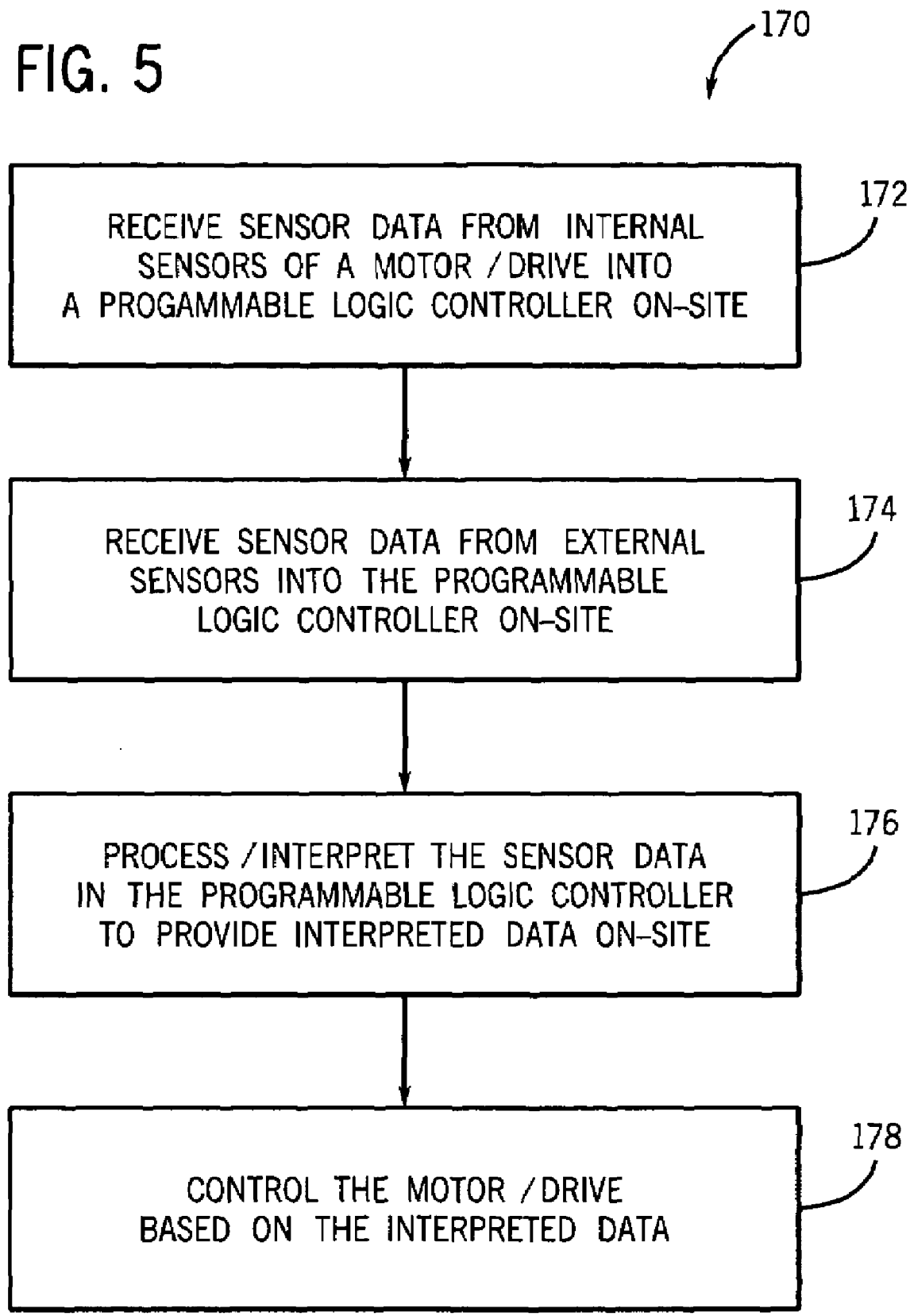

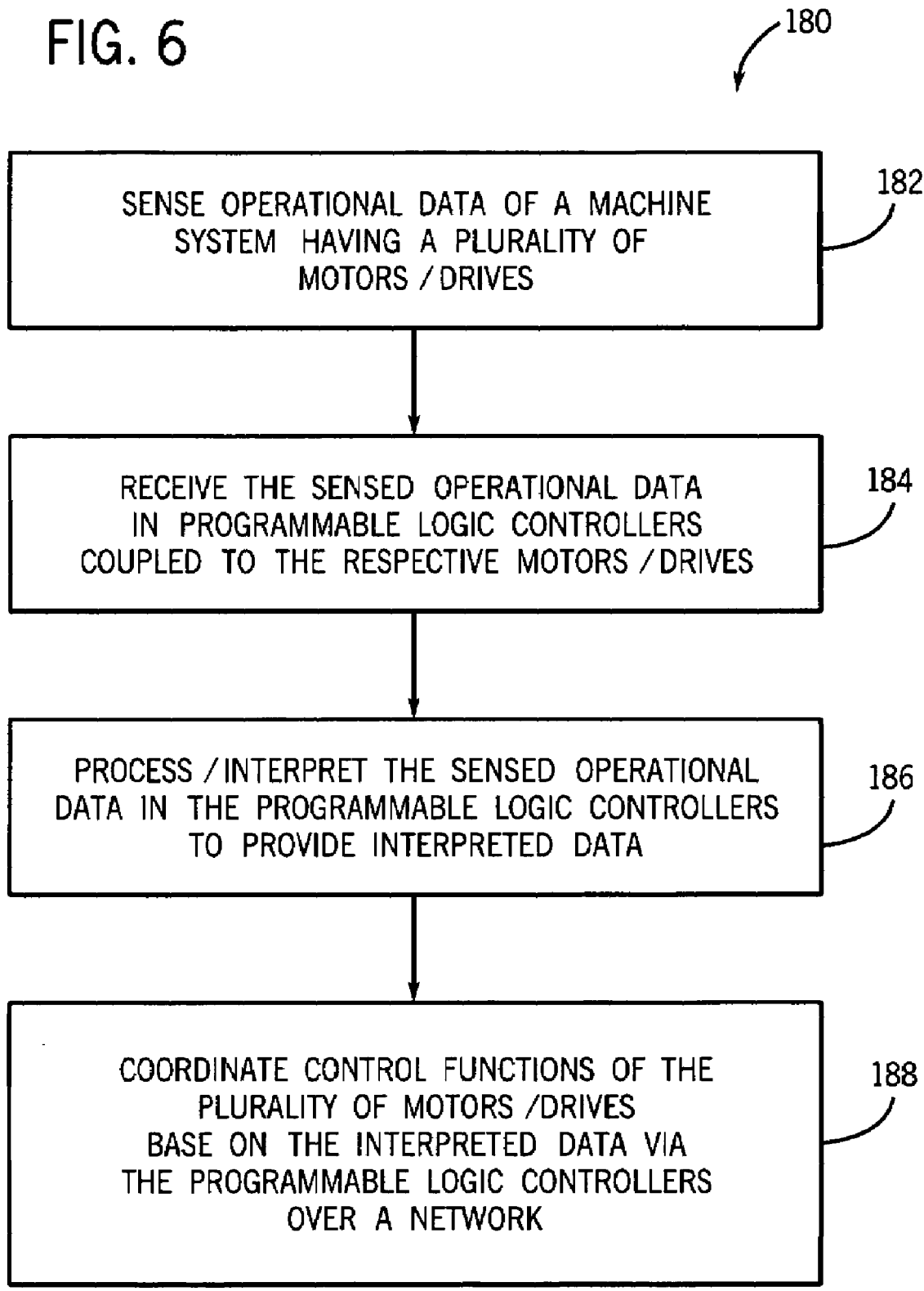

MOTOR HAVING INTEGRAL PROGRAMMABLE LOGIC CONTROLLER

BACKGROUND

The present invention relates generally to the field of electrical rotating machines, such as motors, generators, or the like. More particularly, the present techniques concern the control of such rotating machines.

Electrical rotating machines, such as electric motors, generators, and other similar devices, are quite common and may be found in diverse industrial, commercial, and consumer settings. These machines are produced in a variety of mechanical and electrical configurations. The configuration of these devices may depend upon the intended application, the operating environment, the available power source, or other similar factors. In general, these devices include a rotor surrounded at least partially by a stator.

For instance, one common design of electrical rotating machine is the induction motor, which is used in numerous and diverse applications. In industry, such motors are employed to drive various kinds of machinery, such as pumps, conveyors, compressors, fans and so forth, to mention only a few. Conventional alternating current (AC) electric induction motors may be constructed for single-phase or multiple-phase power and are typically designed to operate at predetermined speeds or revolutions per minute (rpm), such as 3600 rpm, 1800 rpm, 1200 rpm, and so forth.

Control schemes are often used to automate electromechanical systems having the foregoing electrical rotating machines. For example, an assembly of power and data wires may connect the electrical rotating machine, sensors, and other components to a central control unit. The central control unit generally receives sensor data and user input, processes the data, and then distributes commands to the various components including the electrical rotating machine. In other words, the central control unit is the brains of the system, while the components merely receive and respond to the commands. As appreciated, extensive wiring, connectors, and response time are particularly influential on the cost, performance, reliability, and safety of the system. Unfortunately, many industrial and commercial systems are spread out over a very large area, which requires long runs of data wires to the components, sensors, and so forth. This results in increased costs and less reliability of the system. This also results in a significant time delay between the time an event occurs in the system and the time that the central control unit subsequently responds to the event. In other words, the sensor feedback may be transmitted in a raw form along a long length of wire to the central control unit, which then processes the raw sensor feedback and provides a control signal to the appropriate components. Again, the control signal may be transmitted along another long length of wire to the appropriate components. These delays can drastically reduce the overall performance of the system.

BRIEF DESCRIPTION

A system, in one embodiment, includes a drive having a housing, a stator disposed in the housing, a rotor disposed in the stator, and a programmable logic controller disposed inside, mounted on, or in general proximity to the housing. In another embodiment, a system includes a network, a first motor having a first integral programmable logic controller coupled to the network, and a second motor having a second integral programmable logic controller coupled to the network. In a further embodiment, a system includes a rotary machine having a rotor and a stator disposed concentric with one another, a microprocessor, memory coupled to the microprocessor, a power supply coupled to the microprocessor and the memory, and a machine sensor coupled to the microprocessor.

DRAWINGS

These and other features, aspects, and advantages of the present invention will become better understood when the following detailed description is read with reference to the accompanying drawings in which like characters represent like parts throughout the drawings, wherein:

FIG. 5 is a flowchart of an exemplary process of operating a motor/drive via a programmable logic controller; and FIG. 6 is a flowchart of an exemplary process of operating a system having a plurality of motors/drives with programmable logic controllers.

DETAILED DESCRIPTION

Figure 1:
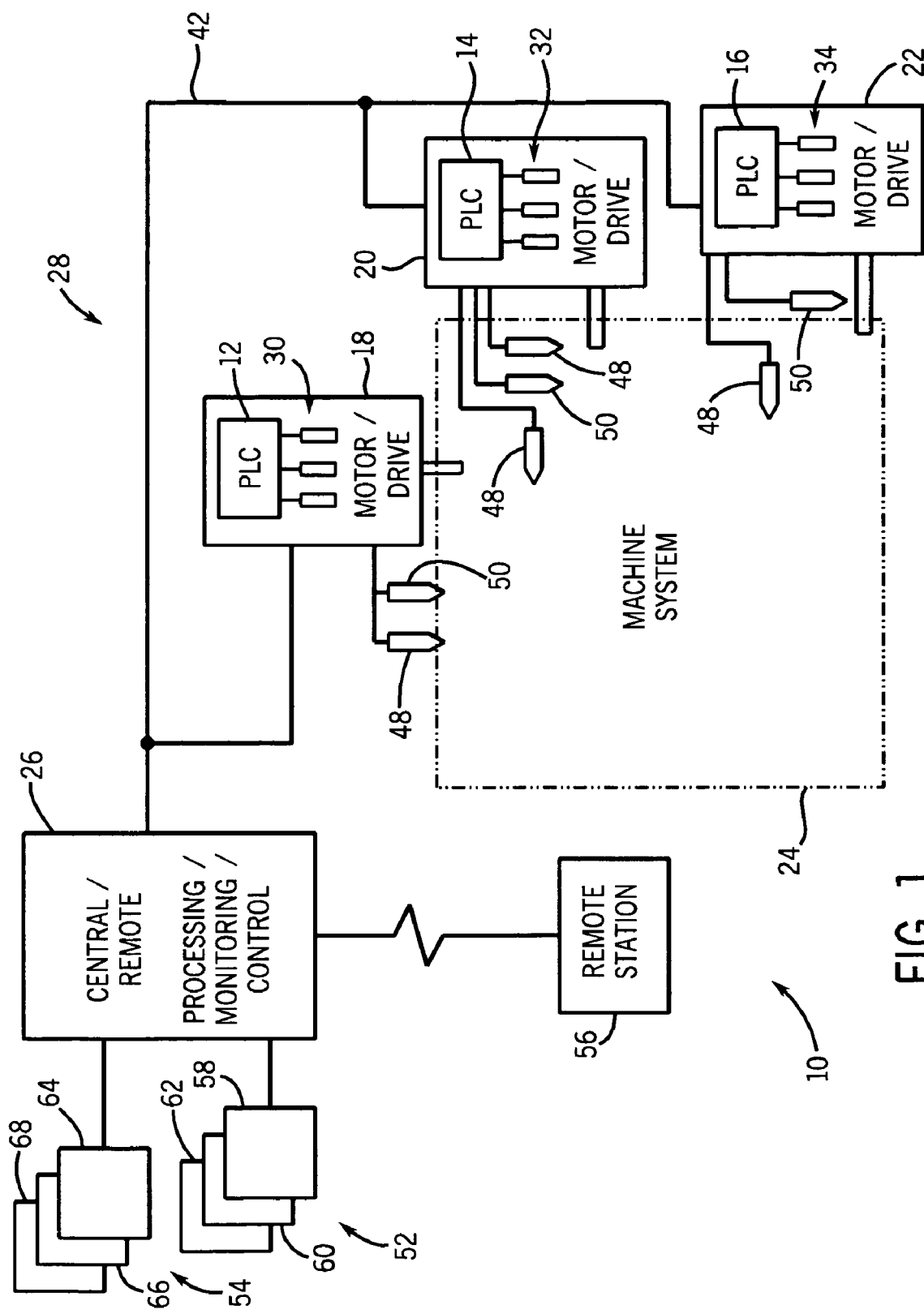
FIG. 1 is a block diagram of an exemplary electromechanical system having a plurality of motors/drives with integral programmable logic controllers.

Turning to the figures, FIG. 1 is a diagram illustrating an exemplary system 10 having programmable logic controllers (PLCs) 12, 14, and 16 directly coupled to or integrated within rotary machines 18, 20, and 22, respectively. In turn, the rotary machines 18, 20, and 22 are coupled to a machine system 24. The rotary machines 18, 20, and 22 may include electric generators, or electric motors, drives, or a combination thereof. However, for sake of brevity, the following discussion refers to the rotary machines 18, 20, and 22 generally as motors/drives, or in certain cases simply motors or drives. The PLCs 12, 14, and 16 may be described as small computers configured to automate control of the motors/drives 18, 20, and 22, the machine system 24, and the overall system 10. However, unlike general-purpose computers, the PLCs 12, 14, and 16 may be packaged and designed for extended temperature ranges, dirty or dusty conditions, immunity to electrical noise, and greater ruggedness or resistance to vibration and impact. In alternative embodiments, the PLCs 12, 14, and 16 may be replaced or supplemented with microcontrollers (MCUs), which may be described as a single integrated circuit or computer on a chip. In general, the PLCs 12, 14, and 16 and/or the MCUs may include a microprocessor, memory (e.g., volatile or non-volatile memory), a power supply (e.g., battery), input/output ports, or a combination thereof. For sake of brevity, the following discussion refers generally to the PLCs 12, 14, and 16 without reference to the MCUs and various components. However, in each of the disclosed embodiments, the PLCs 12, 14, and 16 may be replaced or supplemented with MCUs or controllers having similar components (e.g., microprocessor, memory, etc.).

As discussed in detail below, the PLCs 12, 14, and 16 are configured to monitor data from sensors, process the sensor data, convert the sensor data into another format (e.g., analog to digital), communicate the sensor data to one or more external destinations, transmit and receive control signals with the external destinations, coordinate control functions with the PLCs in the other motors, and so forth. In other words, the PLCs 12, 14, and 16 are configured to intelligently monitor and control the machine system 24 individually or collectively as a group based on various feedback from within or outside the respective motors/drives 18, 20, and 22, the machine system 24, and the system 10 as a whole. For example, sensor feedback may include current, voltage, power, temperature, vibration, pressure, speed, flow rate, acceleration, and so forth. Similarly, the control functions of the PLCs 12, 14, 16 may be configured to adjust the current, voltage, speed, acceleration, cooling systems (e.g., fan speed or coolant flow rate), or other parameters of the motor system. For example, the PLCs 12, 14, and 16 may adjust a variety of parameters to control the output speed and/or torque provided by the motors/drives 18, 20, and 22. For example, the PLCs 12, 14, and 16 may control frequency using an inverter, which results in a change in output speed. Alternatively, the PLCs 12, 14, and 16 may control a clutch position or degree of engagement or disengagement, thereby controlling the final output speed. For example, the PLCs 12, 14, and 16 may adjust the degree of slip on a clutch between the motors/drives 18, 20, and 22 and various gear reducers, pulleys, sprockets, and so forth. The PLCs 12, 14, and 16 also may adjust parameters of a gear box to control the final output speed and/or torque from the motors/drives. These examples are not intended to be limiting in any way.

The system 10 may include one or more commercial or industrial applications, such as manufacturing, processing, distributing, material handling, mining, petrochemical processing, and transportation. Moreover, these applications may entail a variety of products, such as food, beverages, clothing, consumer products, automotive, marine, aircraft (e.g., airport baggage), water, sewage and waste products, petroleum, and so forth. The actual machinery and components employed in the system 10 may comprise one or more motors, pumps, compressors, heating devices, cooling devices, gearing mechanisms, conveyors (e.g., belt-driven or chain-driven), robotics, overhead carriers, manufacturing devices (e.g., machining devices), sorting mechanisms, labeling mechanisms, sensors, actuators, solenoids, valves, magnetic starters, relays, clutches, and so forth. Accordingly, although specific embodiments are described in further detail below, the present techniques are intended for use in a variety of contexts.

As further illustrated in FIG. 1, the motors/drives 18, 20, and 22 are coupled to a central/remote system 26 via a power and data distribution system 28. Similarly, the PLCs 12, 14, and 16 are coupled to the central/remote system 26 and, also, to one another via the power and data distribution system 28. In operation, the PLCs 12, 14, and 16 are engageable (i.e., configured to be engaged) locally or remotely to monitor, process, diagnose, service, or generally control the system. For example, the motors/drives 18, 20, and 22 generally include one or more sensors, such as sensor sets 30, 32, and 34, respectively. These sensors 30, 32, and 34 are configured to monitor various operational parameters of the respective motors/drives 18, 20, and 22, which can then be used to control the system via the PLCs 12, 14, and 16 and/or the central/remote system 26. Moreover, the illustrated central/ remote system 26 may comprise a variety of hardware and software adapted for monitoring, processing, diagnosing, or generally controlling the system 10. The illustrated system 28 may comprise a plurality of data and power lines, such as line 42. The PLCs 12, 14, and 16 facilitate operation and cooperation of the machine system 12, the motors/drives 18, 20, and 22, and a variety of input/output devices, such as sensors 48 and actuators 50, over the one or more lines 42.

In addition, the central/remote system 26 and/or the power and data distribution system 28 may be coupled to a variety of other local and remote machine systems or facilities, such as local facilities 52 and 54 and remote station 56. For example, the local facility 52 may have machine systems 58, 60, and 62, while the local facility 54 has machine systems 64, 66, and 68. Again, these machine systems 58 through 68 may have one or more PLCs (e.g., PLCs 12, 14, and 16) directly coupled to or integrated within motors or machines (e.g., motors/drives 18, 20, and 22).

Regarding the wiring arrangement of the illustrated system 10, the one or more lines 42 may comprise an AC or DC supply in addition to the communication line. For example, the power and data distribution system 28 may provide power to the PLCs 12, 14, and 16, the sensors 48, and the actuators 50. It also should be noted that the illustrated power and data distribution system 28 may comprise a variety of distributed machine networks, circuitry, and protocols, such as DeviceNet, ControlNet, and Ethernet provided by Rockwell Automation, Inc. of Milwaukee, Wis.

As illustrated in FIG. 1, the motors/drives 18, 20, and 22 and the corresponding PLCs 12, 14, and 16 are generally disposed in series along the power and data distribution system 28, such that the PLCs 12, 14, and 16 may exchange data and commands directly with one another, e.g., in a serial manner. In other words, the PLCs 12, 14, and 16 can transmit data and commands directly between one another rather than first transmitting data to the central/remote control 26 and then waiting for a subsequent response. This direct or serial interaction between the PLCs 12, 14, and 16 may significantly improve the response time for controlling the overall system 10 and coordinating command functions between the motors/drives 18, 20, and 22. For example, the PLCs 12, 14, and 16 may exchange operational data of their respective motors/drives 18, 20, and 22 with one another to ensure that the motors/drives are in sync with one another or generally provide an organized movement within the machine system 24. By further example, if the PLC 12 receives sensor feedback from the sensors 30 indicative of overheating, overspeeding, or another problem, then the PLC 12 may communicate this data or commands to the other PLCs 14 and 16 to collectively respond to the problem, e.g., reduce speed, shut down, and so forth. The PLCs 12, 14, and 16 also may coordinate operation of the motors/drives 18, 20, and 22 with various other components of the system, such as pumps, cooling systems, heating systems, and so forth.

In addition to the direct coordination between the PLCs 12, 14, and 16, each of the PLCs is configured to directly control its respective motor/drive in response to sensor feedback from internal and external sensors. For example, the PLC 12 may receive and read sensor data from the internal sensors 30, the external sensors 48 coupled to the machine system 24, and the sensors 32 and 34 disposed inside the other motors 20 and 22. For example, the internal sensors 30 may provide feedback on the motor/drive current, motor/drive voltage, motor/drive temperature, motor/drive speed, motor/drive acceleration, bearing vibration, coolant flow rate, cooling fan speed, clutch state, coolant temperature, coolant pressure, and so forth. The sensors 48 may provide feedback on the response of the machine system 24, such as speed, acceleration, pressure, temperature, vibration, and so forth. On-site or inside the motor/drive 18, the PLC 12 can then read the sensor data, process or interpret the sensor data, and then control various parameters of the motor/drive 18 based on the interpreted sensor data. The PLC 12 also may control various parameters of the motor/drive 18 based on interpreted data from the other PLCs 14 and 16, the central/remote control 26, and other components. Furthermore, the PLC 12 may communicate the interpreted sensor data to the other PLCs 14 and 16 and/or the central/remote control 26 for additional control functions. Likewise, the PLC 12 may distribute control commands to the other PLCs 14 and 16 to ensure uniformity in the response to particular feedback. For example, if the PLC 12 provides a control signal to reduce the current and, thus, speed of the motor/drive 18, then the PLC 12 may also transmit similar commands to PLCs 14 and 16 via the power and data distribution system 28.

In the illustrated embodiment, the PLCs 12, 14, and 16 are disposed directly inside or integrated with the respective motors/drives 18, 20, and 22. In other embodiments, the PLCs 12, 14, and 16 may be disposed on-site or in-situ with the respective motors/drives 18, 20, and 22, yet these PLCs 12, 14, and 16 may be disposed outside the housing of the respective motors/drives 18, 20, and 22. For example, the PLCs 12, 14, and 16 may be directly coupled to or mounted on an external surface of the motors/drives 18, 20, and 22. In other embodiments, the PLCs 12, 14, and 16 may be disposed in close proximity but separate from the respective motors/drives 18, 20, and 22. However, the PLCs 12, 14, and 16 are generally within, on, or in close proximity to the motors/drives 18, 20, and 22 to enable fast response times to control the motors/drives 18, 20, and 22 in response to sensor feedback and commands. For example, the PLCs 12, 14, and 16 may be an integral part of the design of the motors/drives 18, 20, and 22, such that the motors and respective PLCs are generally made and sold as a single unit. However, the PLCs 12, 14, and 16 also may be made as an add-on or retrofit package, which can then be assembled with preexisting designs of motors. In other words, a customer may purchase the PLCs 12, 14, and 16, and then subsequently mount these PLCs directly onto the motor/drive casing or in close proximity to the motors. Some of the motors/drives 18, 20, and 22 also may include an add-on slot or receptacle configured to receive the PLCs 12, 14, and 16 as an optional component at the point of sale or afterwards. Thus, a customer may initially purchase the motors/drives 18, 20, and 22 without the respective PLCs 12, 14, and 16, and then subsequently purchase the PLCs if needed for a particular application.

Figure 2:
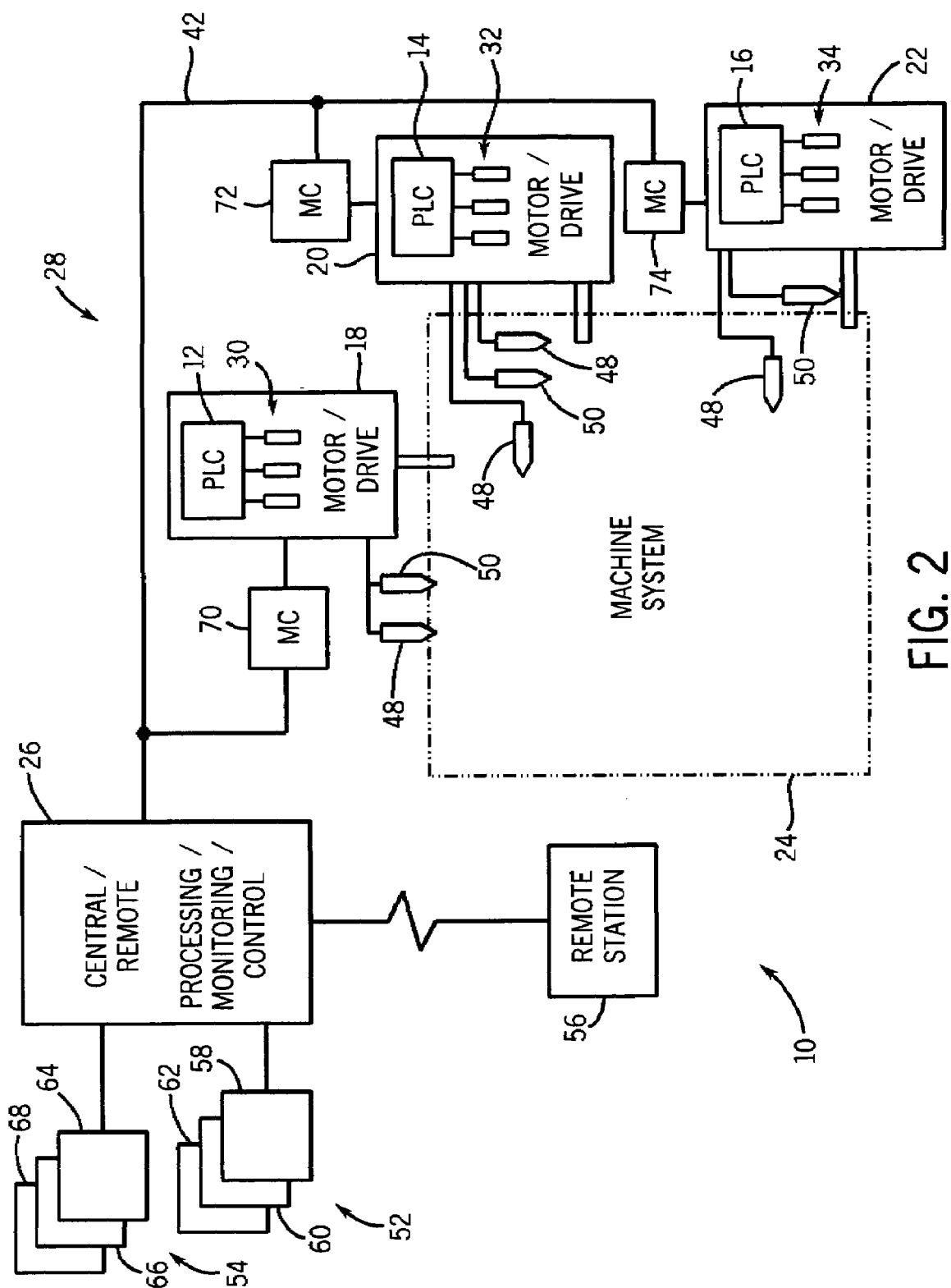
FIG. 2 is a block diagram of another electromechanical system having a plurality of motors/drives with integral programmable logic controllers and external motor/drive controllers.

FIG. 2 is a block diagram of the system 10 as illustrated in FIG. 1, further including motor/drive controllers (MCs) 70, 72, and 74 coupled to the motors/drives 18, 20, and 22 in addition to the integral PLCs 12, 14, and 16, respectively. As illustrated, the motor/drive controllers 70, 72, and 74 are disposed generally on-site with the motors/drives 18, 20, and 22, respectively. For example, the motor/drive controllers 70, 72, and 74 may be mounted directly on or in close proximity to the respective motors/drives 18, 20, and 22. These motor/drive controllers 70, 72, and 74 may complement and/or supplement the PLCs 12, 14, and 16. For example, the PLCs 12, 14, and 16 may receive and interpret sensor feedback data and other inputs, and then transmit the interpreted data to the motor/drive controllers 70, 72, and 74 for analysis and selection of an appropriate command. In certain embodiments, the motor/drive controllers 70, 72, and 74 may simply be redundant to the PLCs 12, 14, and 16. Thus, if either the PLCs or the motor/drive controllers fail, then the remaining one performs the control functions. In general, the motor/drive controllers 70, 72, and 74 may interact with and rely on certain features of the PLCs 12, 14, and 16 and the central/remote control 26. However, in some embodiments, the motor/drive controllers 70, 72, and 74 may include a similar PLC, MCU, or other intelligent controller features such as a microprocessor and memory. However, in the embodiment of FIG. 1, the system 10 completely excludes the motor/drive controllers 70, 72, and 74, relying solely on the PLCs 12, 14, and 16. Again, the PLCs 12, 14, and 16 enable quick response times and direct control inside the respective motors/drives 18, 20, and 22 without waiting for communications to and from the central/remote control 26 and with increased reliability. In other words, the motors/drives 18, 20, and 22 have brains or intelligent monitoring and control features via the respective PLCs.

Figure 3:
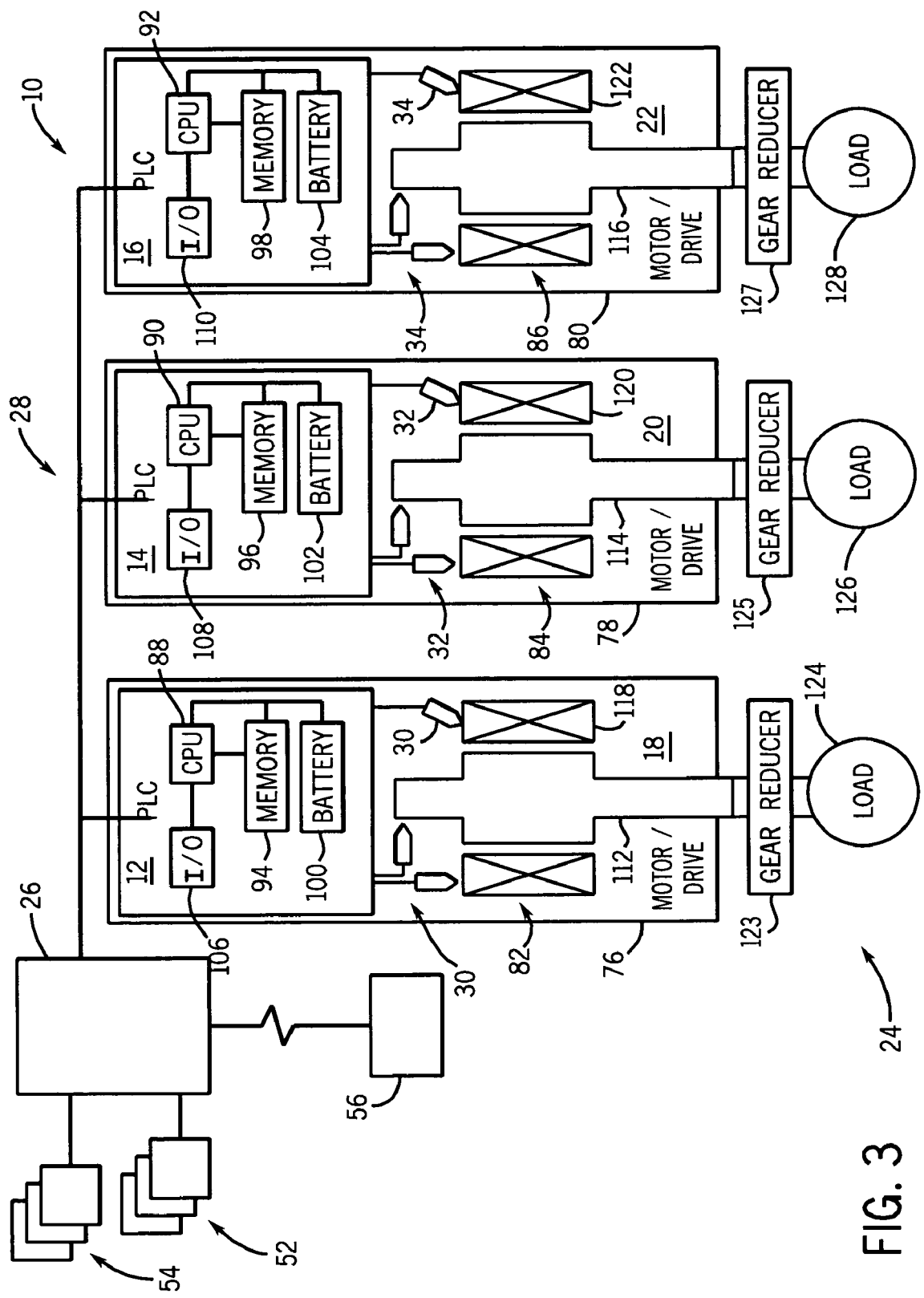
FIG. 3 is a block diagram illustrating details of the motors/drives and programmable logic controllers of the electromechanical system of FIG. 1.

FIG. 3 is a block diagram illustrating details of the PLCs 12, 14, and 16 within the respective motors/drives 18, 20, and 22 of the system 10 as illustrated in FIG. 1. In the illustrated embodiment, the motors/drives 18, 20, and 22 include outer casings or housings 76, 78, and 80, which generally enclose and support the PLCs 12, 14, and 16, the plurality of sensors 30, 32, and 34, and respective rotor and stator assemblies 82, 84, and 86. The illustrated PLCs 12, 14, and 16 include central processing units (CPUs) or microprocessors 88, 90, and 92, one or more types of memory 94, 96, and 98, power supplies such as batteries 100, 102, and 104, and one or more input/output ports or interfaces 106, 108, and 110, respectively. For example, the memory 94, 96, and 98 may include volatile and non-volatile memory, such as read-only memory (ROM), random access memory (RAM), magnetic storage devices, optical storage devices, and so forth.

In certain embodiments, the memory 94, 96, and 98 may store various control parameters, motor/drive operational data, system operational data, minimum and maximum limits for various parameters, sensor feedback data, maintenance data, and so forth. For example, the memory 94, 96, and 98 may include code configured to analog feedback data to digital form, compare the data with pre-selected limits or targets, and provide control commands in response to various inputs. The input/output ports 106, 108, and 110 may be configured to communicate wirelessly or with wires between the various PLCs, sensors, and other components of the system 10. For example, the input/output ports 106, 108, and 110 may receive signals from the respective sensors 30, 32, and 34. As illustrated, the sensors 30, 32, and 34 are disposed at various points around the rotor and stator assemblies 82, 84, and 86. In the illustrated embodiment, these assemblies 82, 84, and 86 include generally concentric arrangements of rotors 112, 114, and 116 disposed within stators 118, 120, and 122. The sensors 30, 32, and 34 may be configured to monitor temperature, rotational speed, acceleration, current, voltage, vibration, and other operational parameters of the respective motors/drives 18, 20, and 22. Again, the PLCs 12, 14, and 16 are disposed directly inside the housings 76, 78, and 80 along with the sensors 30, 32, and 34 to enable rapid feedback control of the motors/drives to provide a suitable output to drive the respective loads 124, 126, and 128 in the machine system 24 and to simplify wiring and increase reliability. In addition, gear boxes or reducers 123, 125, and 127 are disposed between the motors/drives 18, 20, and 22 and the respective loads 124, 126, and 128. These gear boxes/reducers 123, 125, and 127 are configured to decrease the speed and increase the torque output from the motors/drives 18, 20, and 22. Alternatively, the gear boxes/reducers 123, 125, and 127 may increase speed, decrease torque, or generally adjust the output from the motors/drives 18, 20, and 22 in response to a control signal from the respective PLCs 12, 14, and 16. Moreover, the gear boxes/reducers 123, 125, and 127 may include clutches, such as wet clutches, configured to adjust the output by altering the slip of clutch plates in response to a control signal from the PLCs 12, 14, and 16.

Figure 4:
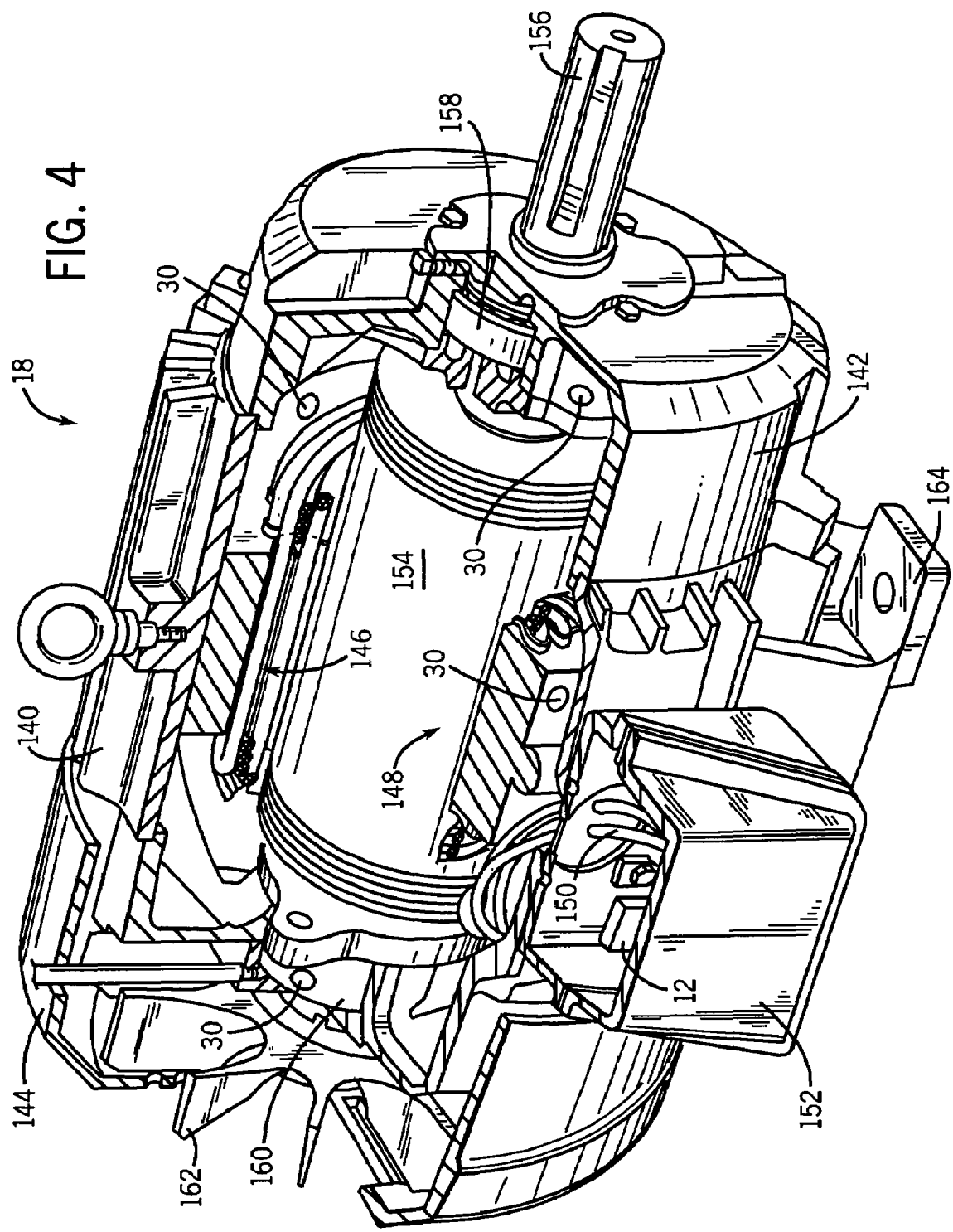
FIG. 4 is a perspective view of an exemplary motor/drive having an integral programmable logic controller and various sensors.

FIG. 4 is a perspective view of an exemplary electric motor, such as the motor/drive 18, having the PLC 12 and sensors 30 disposed therein. The illustrated motor/drive 18 is simply one example that may benefit from the PLC 12 and sensors 30 described above and further below. In the embodiment illustrated in FIG. 4, motor/drive 18 is an induction motor/drive housed in an enclosure. Accordingly, motor/drive 18 includes a frame 140 open at front and rear ends and capped by a front end cap 142 and a rear end cap 144. The frame 140, front end cap 142, and rear end cap 144 form a protective shell, or housing, for a stator assembly 146 and a rotor assembly 148. Stator windings are electrically interconnected to form groups, and the groups are, in turn, interconnected. The windings are further coupled to terminal leads 150. The terminal leads 150 are used to electrically connect the stator windings to an external power cable coupled to a source of electrical power. Energizing the stator windings produces a magnetic field that induces rotation of the rotor assembly 148. The electrical connection between the terminal leads and the power cable is housed within a conduit box 152.

In the embodiment illustrated, rotor assembly 148 comprises a rotor 154 supported on a rotary shaft 156. The shaft 156 is configured for coupling to a driven machine element for transmitting torque to the machine element. Rotor 154 and shaft 156 are supported for rotation within frame 140 by a front bearing set 158 and a rear bearing set 160 carried by front end cap 142 and rear end cap 144, respectively. In the illustrated embodiment of electric motor/drive 18, a cooling fan 162 is supported for rotation on shaft 156 to promote convective heat transfer through the frame 140. The frame 140 generally includes features permitting it to be mounted in a desired application, such as integral mounting feet 164. However, a wide variety of rotor configurations may be envisaged in motors that may employ the techniques outlined herein. Moreover, the disclosed techniques may be employed on rotors for a variety of different motors, generators, and other electromechanical devices.

In the illustrated embodiment of FIG. 4, the sensors 30 may be disposed throughout the interior of the frame 140. The PLC 12 may be disposed in a suitable enclosure, such as the conduit box 150, mounted to the frame 140. In other embodiments, the frame 140 may be modified or enlarged to enable mounting of the PLC 12 directly inside the interior of the motor/drive 18. For example, the PLC 12 may be mounted in an end region between one of the end caps 142 and 144 and the inner stator and rotor assemblies 146 and 148, or at another suitable interior location. The PLC 12 mounting is not intended to not be limited to any particular location or configuration. In certain embodiments, a pair of redundant or cooperative PLCs 12 may be disposed both within the frame 140 and the conduit box 152. In addition, the sensors 30 may be disposed throughout the interior and exterior of the motor/drive 18. For example, sensors 30 may be disposed adjacent the bearing sets 158 and 160, the stator assembly 146, the rotor assembly 148, and various other locations. Accordingly, the sensors 30 may be configured to monitor vibration of the bearing sets 158 and 160 or the overall assembly, the temperature of the windings, the current, the voltage, and so forth. The sensors 30 also may be configured to monitor an air flow rate of the cooling fan 162, a coolant flow rate of a fluid (e.g., water), or parameters of another cooling system. In view of all of this sensor feedback, the PLC 12 may adjust various parameters of the motor/drive 18 and its integral components.

FIG. 5 is a flowchart of an exemplary process 170 of operating a motor/drive having a programmable logic controller on-site. As illustrated, the process 170 may begin by receiving sensor data from internal sensors of a motor/drive into a programmable logic controller on-site (block 172). For example, the programmable logic controller may be disposed entirely within, external but mounted directly on, or in close proximity to a motor/drive, a generator, or a combination thereof. The internal sensors may include temperature sensors, voltage sensors, current sensors, vibration sensors, and so forth. The process 170 may also receive sensor data from external sensors into the programmable logic controller on-site (block 174). For example, the external sensors may relate directly to the motor/drive or other components within an overall system. These sensors may retrieve data corresponding to temperature, pressure, vibration, speed, acceleration, flow rate, and so forth.

The process 170 may then proceed to process and/or interpret the sensor data in the programmable logic controller to provide interpreted data on-site (block 176). In other words, the block 176 may involve converting analog sensor data into a digital form, such as an integer value within a preset integer range corresponding to the analog signal data. The block 176 also may involve analyzing and comparing the sensor data relative to historical data, preset limits and targets, and other control parameters. Finally, the process 170 may proceed to control the motor/drive based on the interpreted data (block 178). For example, the programmable logic controller may directly control the motor/drive based on the interpreted data. Alternatively, the interpreted data may be transmitted to an external controller or central control unit to provide a suitable command to the motor/drive. In either case, the programmable logic controller facilitates interpretation of sensor data and control of the motor/drive directly on-site, e.g., within, directly on, or in close proximity to the motor/drive.

FIG. 6 is a flowchart of an exemplary process 180 for operating a system having a plurality of motors/drives via corresponding programmable logic controllers. In the illustrated embodiment, the process begins by sensing operational data of a machine system having a plurality of motors/drives (block 182). For example, the sensed operational data may correspond to operational characteristics of the motors/drives, other components of the system, environmental parameters, and so forth. The process 180 may then proceed to receive the sensed operational data in programmable logic controllers coupled to the respective motors/drives (block 184). For example, the programmable logic controllers may be disposed within or directly coupled to the outside of the respective motors/drives. The process 180 may then proceed to process and/or interpret the sensed operational data in the programmable logic controllers to provide interpreted data (block 186). In turn, the process 180 may proceed to coordinate control functions of the plurality of motors/drives based on the interpreted data via the programmable logic controllers over a network (block 188). For example, the programmable logic controllers may exchange sensor data, control commands, and other information directly between one another to ensure that the motors/drives work together as a functional unit. Thus, the programmable logic controllers facilitate direct interaction between the respective motors/drives without the need for external motor/drive controllers or a remote control system. However, these external motor/drive controllers and remote control unit also may be incorporated into the process 180.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a motor/drive, having a housing, a stator disposed in the housing, a rotor disposed in the stator, and a motor drive coupled to the motor and configured to drive the motor; and
   a programmable logic controller means disposed inside, mounted on, or in general proximity to the housing and configured to control operation of the motor/drive without an external drive controller.

2. The system of claim 1, wherein the programmable logic controller means is configured to monitor and interpret sensor data.

3. The system of claim 2, wherein the sensor data comprises voltage, or current, or power, or temperature, or vibration, or a combination thereof, of the drive.

4. The system of claim 1, wherein the programmable logic controller means is configured to coordinate operation of the motor/drive with other components of the system.

5. The system of claim 1, comprising a plurality of motor/drives having programmable logic controller means configured to communicate with one another via a network.

6. The system of claim 1, comprising a drive controller disposed outside of the housing, wherein the drive controller is communicatively coupled to the programmable logic controller means.

7. The system of claim 1, comprising a remote control and monitor system communicatively coupled to the drive.

8. A system, comprising:
   a network;
   a first motor comprising a first integral programmable logic controller means and a motor drive, and wherein first integral programmable logic controller means is coupled to the network and configured to control operation of the first motor without receiving instructions from a controller external to the first motor; and
   a second motor comprising a second integral programmable logic controller means and a motor drive, and wherein first integral programmable logic controller means is coupled to the network and configured to control operation of the second motor without receiving instructions from a controller external to the second motor.

9. The system of claim 8, wherein the first and second integral programmable logic controller means are coupled to the network in series with one another.

10. The system of claim 8, wherein the first and second integral programmable logic controller means are configured to coordinate control functions with one another.

11. The system of claim 8, wherein the first and second integral programmable logic controller means are configured to read sensor data, interpret the sensor data, and control the respective first and second motors or the system based on the sensor data.

12. The system of claim 8, wherein the first and second integral programmable logic controller means are configured to read sensor data, interpret the sensor data, and communicate the interpreted sensor data with external components of the system.

13. The system of claim 8, comprising a remote monitoring and control system coupled to the network.

14. A system, comprising:
   a rotary machine, having a rotor and a stator disposed concentric with one another;
   a programmable logic controller means having, a microprocessor, memory coupled to the microprocessor, a power supply coupled to the microprocessor and the memory, and a machine sensor coupled to the microprocessor;
   a motor drive coupled to the motor; and
   wherein the motor drive is configured to drive the motor and the programmable logic controller means is configured to control operation of the rotary machine without receiving instructions from a controller external to the rotary machine.

15. The system of claim 14, wherein the rotary machine comprises a motor, or a drive, or a generator, or a combination thereof.

16. The system of claim 14, wherein the processor is configured to interpret signals from the machine sensor and to control the rotary machine based on the interpreted signals.

17. The system of claim 14, wherein the processor is configured to interpret signals from the machine sensor and to communicate the interpreted signals with external components of the system.

18. The system of claim 14, wherein the memory comprises volatile memory, non-volatile memory, or a combination thereof.

19. The system of claim 14, wherein the power supply comprises a battery.

* * * * *